(12) United States Patent
Sautter et al.

(10) Patent No.: US 10,780,837 B2
(45) Date of Patent: Sep. 22, 2020

(54) VEHICLE RACK WITH LOADING APPARATUS

(71) Applicant: Yakima Products, Inc., Lake Oswego, OR (US)

(72) Inventors: Chris Sautter, Portland, OR (US); Scott A. McFadden, Portland, OR (US); Ashley Hoch, Portland, OR (US); Warren E. Stoneburner, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

(21) Appl. No.: 15/842,670

(22) Filed: Dec. 14, 2017

(65) Prior Publication Data

US 2018/0162288 A1    Jun. 14, 2018

Related U.S. Application Data

(60) Provisional application No. 62/434,071, filed on Dec. 14, 2016.

(51) Int. Cl.
| | |
|---|---|
| *B60R 9/042* | (2006.01) |
| *B60R 9/048* | (2006.01) |
| *B60R 9/052* | (2006.01) |
| *B60R 9/08* | (2006.01) |
| *B60R 9/045* | (2006.01) |
| *B60P 3/10* | (2006.01) |

(52) U.S. Cl.
CPC ............ *B60R 9/0426* (2013.01); *B60R 9/042* (2013.01); *B60R 9/045* (2013.01); *B60R 9/048* (2013.01); *B60R 9/052* (2013.01); *B60R 9/08* (2013.01); *B60P 3/1008* (2013.01)

(58) Field of Classification Search
CPC ....... B60R 9/0426; B60R 9/052; B60R 9/045; B60R 9/08; B60R 9/048; B60R 9/042; B60P 1/00; B60P 3/1008; B60P 3/10
USPC ........................................................ 224/310
See application file for complete search history.

(56) References Cited

U.S. PATENT DOCUMENTS

| | | | | |
|---|---|---|---|---|
| 5,884,824 | A * | 3/1999 | Spring, Jr. ............... | B60R 9/042 224/309 |
| 6,428,263 | B1 * | 8/2002 | Schellens ................ | B60R 9/042 224/310 |
| 6,561,396 | B2 | 5/2003 | Ketterhagen | |
| 6,681,970 | B2 * | 1/2004 | Byrnes ..................... | B60R 9/042 224/310 |

(Continued)

*Primary Examiner* — Nathan J Newhouse
*Assistant Examiner* — Matthew T Theis
(74) *Attorney, Agent, or Firm* — Kolisch Hartwell, P.C.

(57) ABSTRACT

A rack for carrying cargo on top of a vehicle is disclosed, comprising a pair of longitudinal support assemblies. Each support assembly is configured for mounting on a crossbar secured across the roof of a vehicle, and includes a stationary base and an extendable rail. Each rail is moveable between a first position in which the rail is substantially coextensive with the base, a second position in which the rail extends significantly beyond the end of the base, and a third position in which the rail pivots downward adjacent a side of the vehicle. Each rail also has a proximal end portion and a distal end portion, with a loading arm pivotably connected to the distal end portion. The loading arm is moveable between a collapsed position parallel the rail and an extended loading position.

20 Claims, 16 Drawing Sheets

(56) References Cited

U.S. PATENT DOCUMENTS

| | | | |
|---|---|---|---|
| 6,764,268 B2 | 7/2004 | Levi | |
| 7,131,561 B2 * | 11/2006 | Humes | B60R 9/08 224/319 |
| 8,322,580 B1 * | 12/2012 | Hamilton | B60R 9/042 224/309 |
| 2014/0144958 A1 * | 5/2014 | Sautter | B60R 9/045 224/314 |
| 2015/0076197 A1 * | 3/2015 | Sautter | B60R 9/045 224/324 |
| 2016/0114733 A1 * | 4/2016 | Pfaeffli | B60R 9/045 224/318 |

* cited by examiner

VEHICLE RACK WITH LOADING APPARATUS

CROSS-REFERENCES TO RELATED APPLICATIONS

This application claims priority under 35 U.S.C. § 119(e) from U.S. Provisional Patent Application Ser. No. 62/434,071 filed Dec. 14, 2016, which is incorporated herein by reference. Also incorporated herein by reference in its entirety is U.S. Pat. No. 9,381,866 B2.

INTRODUCTION

Popularity of recreational activities continues to grow, with corresponding growth and need for carrying recreational equipment and cargo on vehicles. For example, boats such as kayaks and canoes, or boards such as stand-up paddle boards and surf boards, are often transported to water recreation areas on top of a vehicle. Frequently, a roof rack mounted to crossbars on the vehicle is used to transport the boats or boards.

However, roof racks mounted on top of a vehicle can be difficult to reach and load. A boat may become unwieldy or unmanageably heavy when lifted to the necessary height. In addition, some users may not be tall or strong enough to load cargo on top of a vehicle. Vehicle rack configurations that assist in loading cargo to a vehicle roof may therefore be beneficial.

DETAILED DESCRIPTION

This disclosure provides numerous selected examples of invented devices for carrying cargo on or with a vehicle. Many alternatives and modifications which may or may not be expressly mentioned, are enabled, implied, currently possessed, and are supported by the disclosure.

Figure 1:
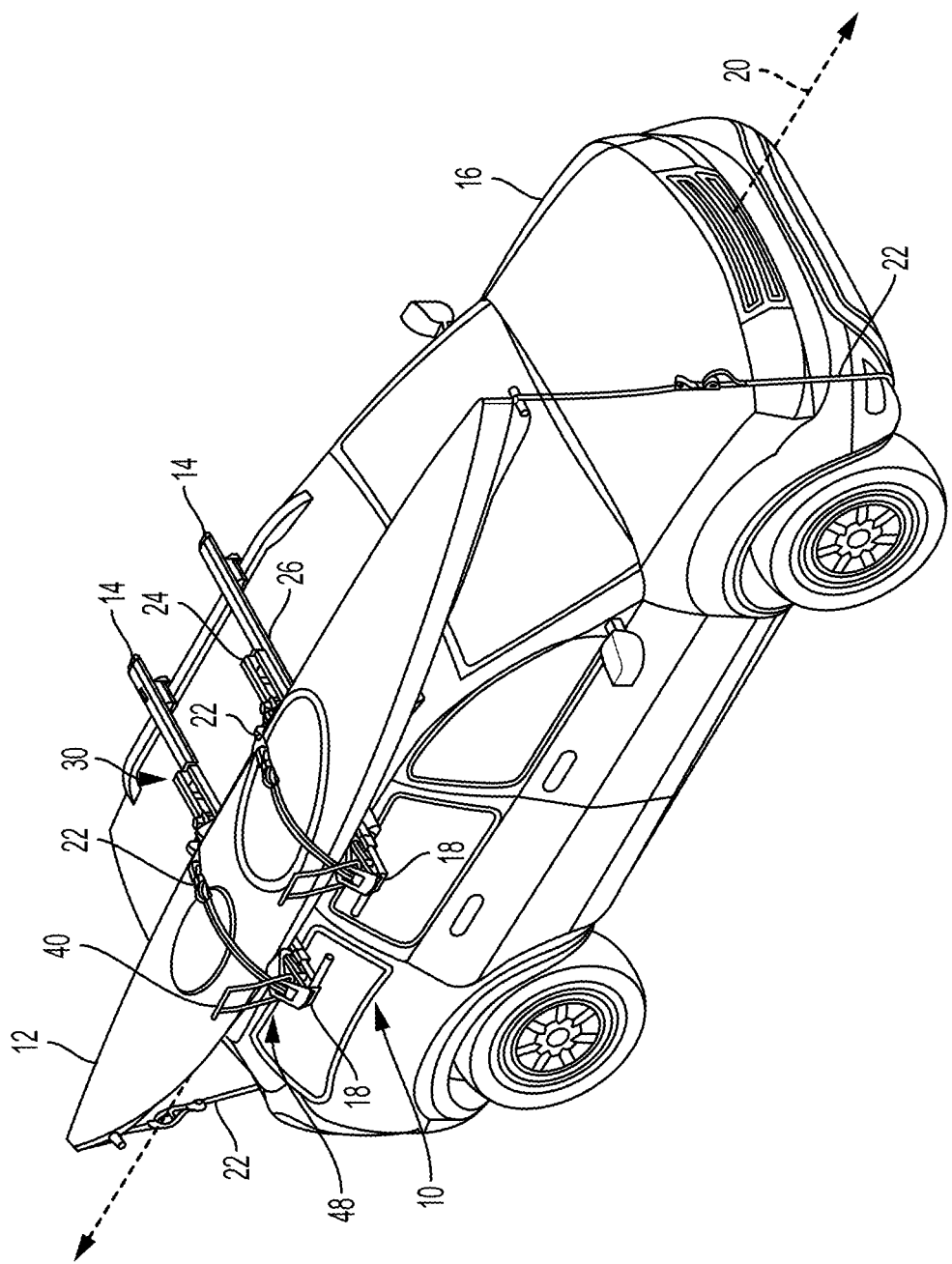
FIG. 1 is a perspective view of a rack according to aspects of the present disclosure, mounted on the roof of a vehicle and carrying a kayak.

FIG. 1 shows an example of a rack generally indicated at 10. A kayak 12 is secured to the rack, which is mounted to crossbars 14 of a vehicle 16. Rack 10 may also be used to transport any cargo of an appropriate shape, such as canoes or standup paddleboards. The rack includes a pair of support assemblies 18. Each support assembly is secured to a respective crossbar, and is generally parallel with the crossbar.

Support assemblies 18 extend laterally over the roof of vehicle 16, perpendicular to a direction of travel 20 of the vehicle. Kayak 12 spans between the support assemblies, generally parallel to the direction of travel. Buckled straps 22 secure the kayak to support assemblies 18, and also to a front end and a rear end of vehicle 16.

Figure 2:
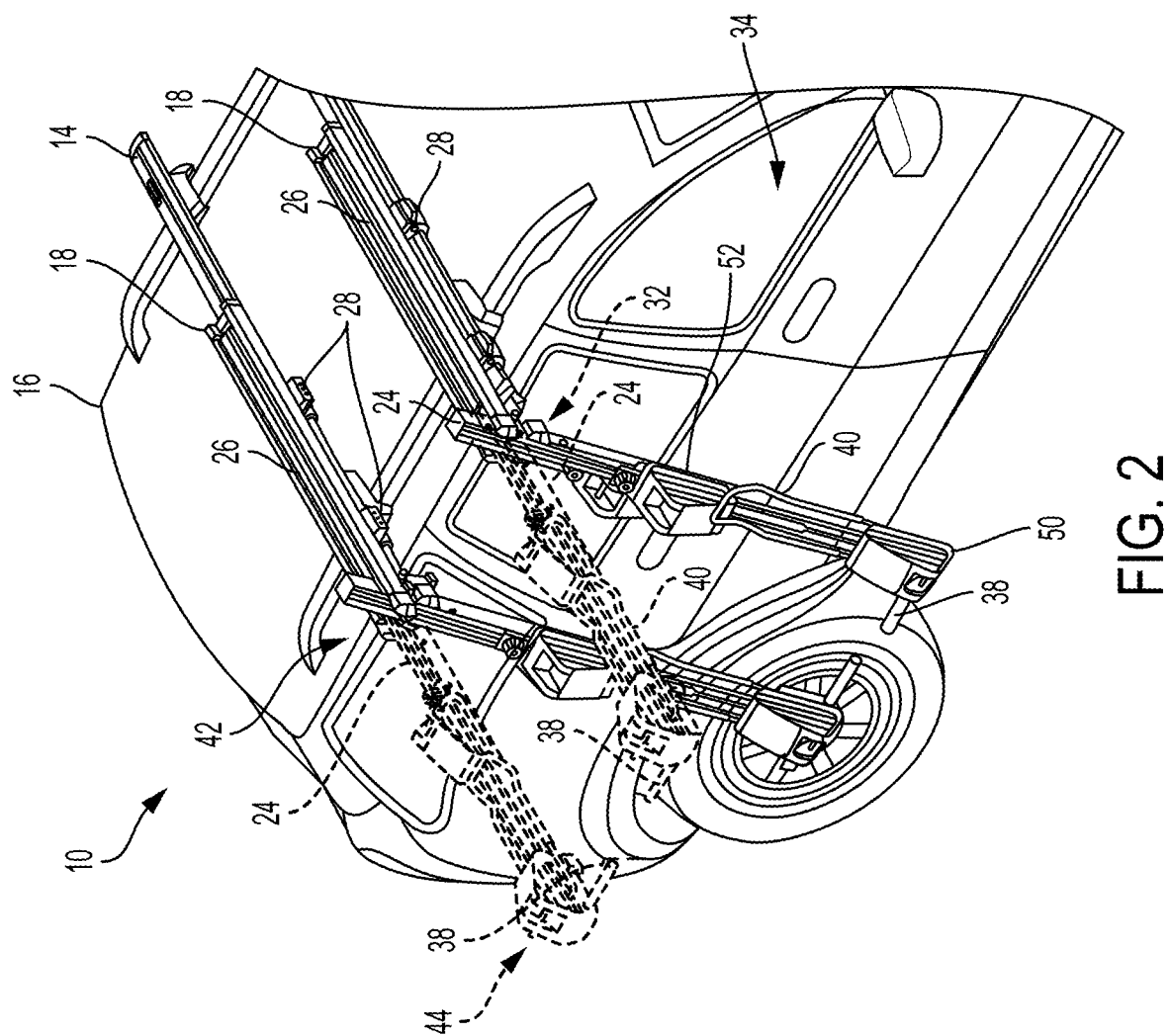
FIG. 2 is a perspective view of the rack of FIG. 1, with an extendable rail of each of a pair of support assemblies of the rack in second and third positions.

As shown more clearly in FIG. 2, each support assembly 18 includes an extendable rail 24 and a stationary base 26. Base 26 includes a pair of clamps 28 that engage crossbar 14 to hold the base fixed relative to vehicle 16. Rail 24 is slidable and pivotable relative to base 26, and can be thereby transitioned between multiple positions.

In a first position 30, shown in FIG. 1, rail 24 is substantially coextensive with base 26. In a second position 32, shown by dashed lines in FIG. 2, rail 24 is parallel to base 26 but a majority of the rail extends beyond an outboard end of the base. The rail also extends outboard past crossbar 14 and a side of vehicle 16. Rail 24 may be transitioned between first position 30 and second position 32 by sliding or rolling along base 26.

A third position 34 of rail 24 is also shown in FIG. 2. In this position rail 24 extends at an angle relative to base 26, downward adjacent the side of the vehicle. The rail may be spaced from the side of vehicle 16, and may not contact the vehicle. Rail 24 may be transitioned between second position 32 and third position 34 by pivoting relative to base 26.

Support assemblies 18 are spaced apart from one another, with the spacing corresponding to the spacing of crossbars 14. The two support assemblies define a region between them. Each support assembly includes a handle 38 that extends into the defined region. In other words, the two handles are mirrored projections and the handle of one support assembly extends toward the other support assembly. The pair of support assemblies 18 may also be referred to as a right-hand support assembly and a left-hand support assembly.

Handle 38 of each support assembly 18 is fixedly coupled to rail 24. The rail has a proximal end portion 42 and a distal end portion 44. The proximal end portion of rail 24 is pivotably coupled to base 26, while handle 38 is coupled to the distal end portion of the rail. The handle is configured to allow a user to transition rail 24 between first position 30, second position 32, and third position 34. The user may grasp one handle in each hand to transition rails 24 of both support assemblies in a coordinated manner. In some examples, handles 38 may comprise an opening or loop on distal end portion 44 of rail 24, support assemblies may be matching, and/or each support assembly 18 may include any effective structure for manual manipulation of rail 24 relative to base 26.

Also included in each support assembly 18 is a stationary saddle mount 50 and an adjustable saddle mount 52. The stationary mount is fixed on distal end portion 44 of rail 24, while adjustable mount 52 may be secured at multiple positions along rail 24. Movement of the adjustable mount relative to rail 24 is illustrated in FIG. 3, and may include sliding the adjustable mount along the rail and clamping or securing the adjustable mount to the rail at a desired position.

Figure 3:
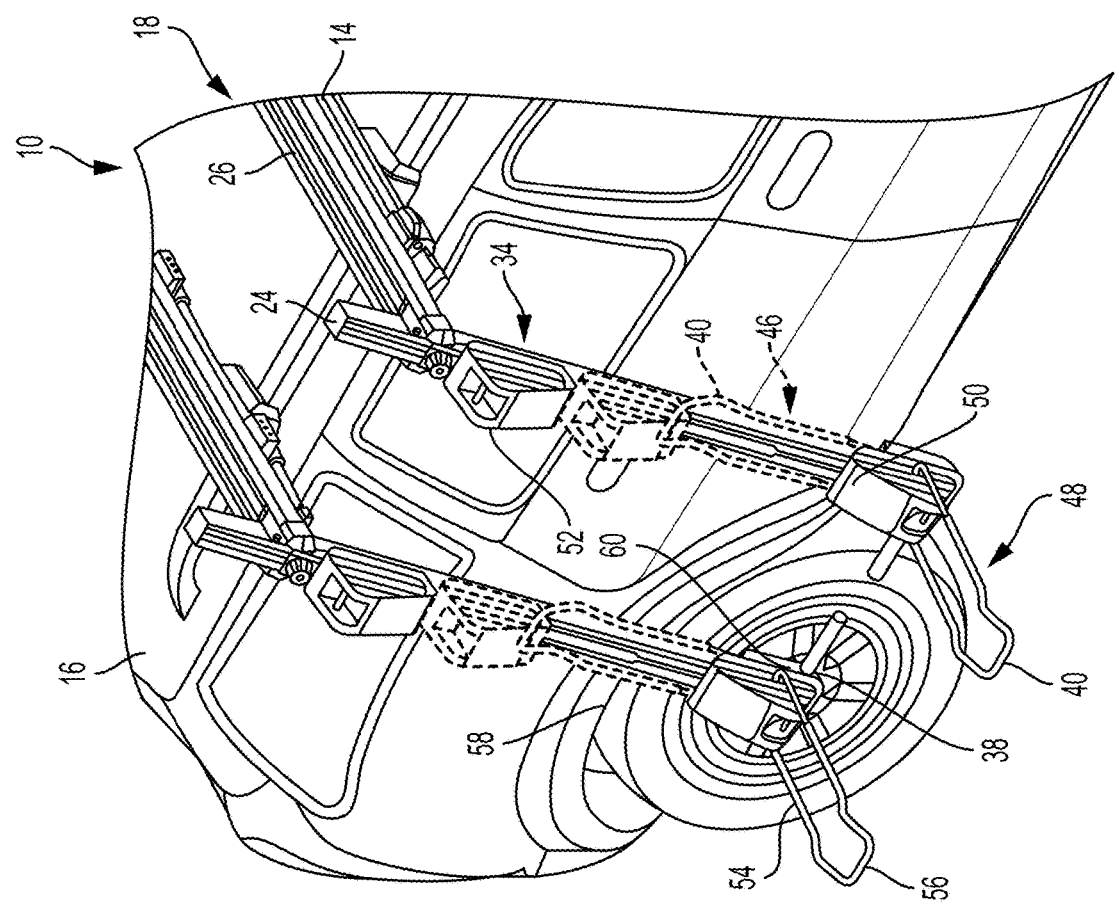
FIG. 3 is a perspective view of the rack FIG. 1, with a loading arm of each of the extendible rails in collapsed and loading positions.

As shown in FIG. 3, each support assembly 18 further includes a loading arm 40 coupled to rail 24. Loading arm 40 is pivotably coupled to the distal end of the rail. In some examples, loading arm 40 may be alternatively or additionally coupled to stationary saddle mount 50. The loading arm is pivotable between two positions, a collapsed position 46 shown in dashed lines and a loading position 48.

In the present example loading arm 40 has a hoop-like shape, with two parallel side portions 54 and a central handle portion 56. In collapsed position 46 the loading arm extends generally parallel to rail 24, with side portions 54 straddling the rail and handle portion 56 proximate to or in contact with a top surface of the rail.

In loading position 48, loading arm 40 forms an obtuse angle 58 with rail 24. A support member 60 is mounted proximate distal end portion 44 of the rail. In the present example, the support member is a strap bar of stationary mount 50. Parallel side portions 54 may contact support member 60 in loading position 48, and be thereby prevented from pivoting further. Weight or other forces on loading arm 40 may be transferred to support member 60, and further through support assembly 18 to clamps 28 on crossbar 14. Loading arms 40 of support assemblies 18 may therefore support a significant portion of the weight of a boat or other cargo to be loaded onto rack 10.

In some examples, loading arm 40 may be supported by handle 38, by a support mounted directly to rail 24, and/or elements of a pivot mechanism of the loading arm. In the present example, loading arm 40 pivots freely between collapsed and loading positions. In some examples, the loading arm may be spring biased, may include a latch mechanism or ratchet and release, and/or may have any appropriate modifications or restrictions to the pivot motion.

Figure 4:
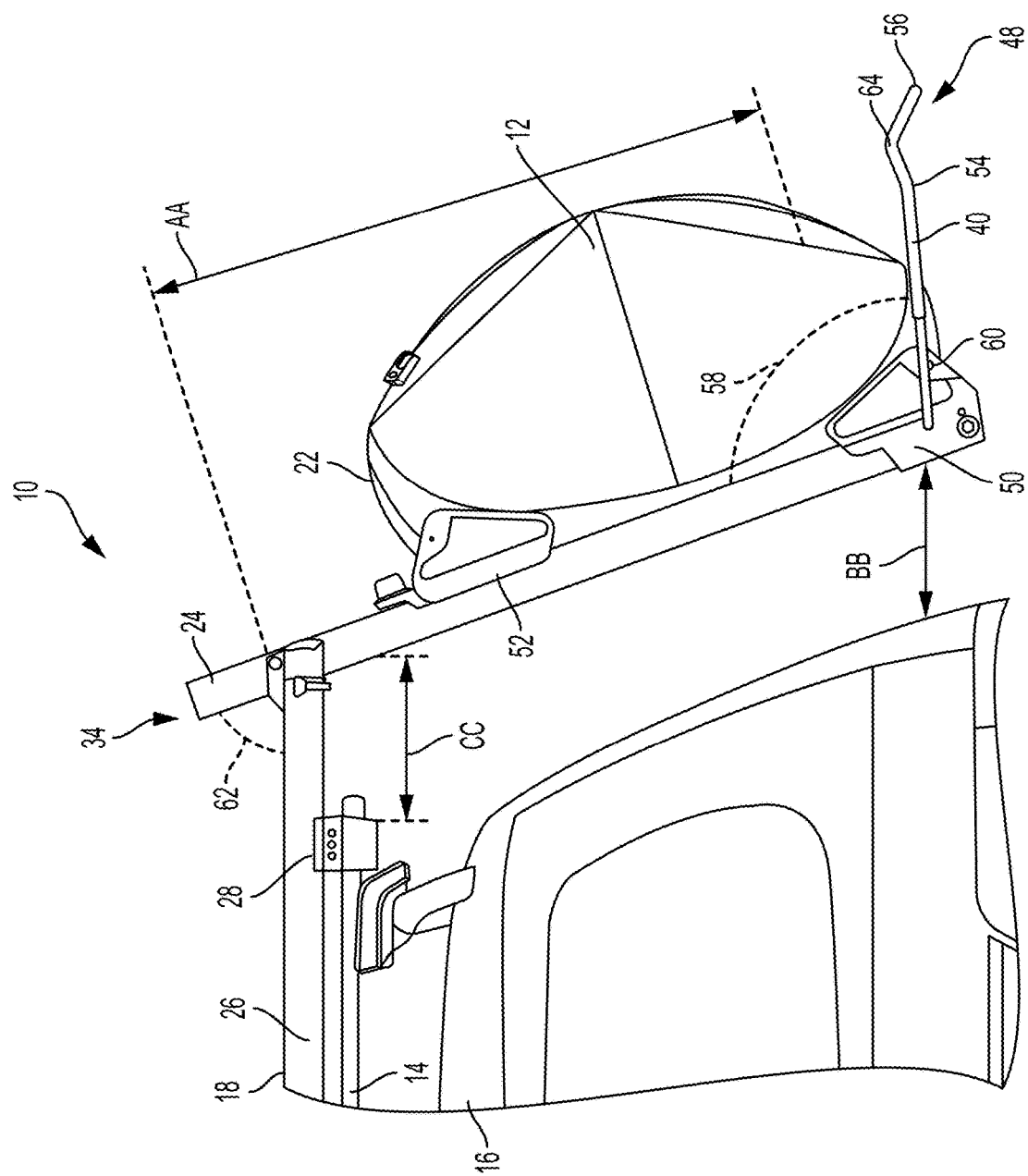
FIG. 4 is a rear view of the rack of FIG. 1, partway through loading of the kayak.

Rack 10 may be transitionable between multiple configurations, to facilitate easy loading and transportation of cargo. FIG. 1 shows the rack in a transport configuration, with rails 24 of the pair of support assemblies 18 in first position 30 and loading arms 40 in loading position 48. A loading configuration is shown in FIG. 4, with rails 24 in third position 34 and loading arms 40 in loading position 48. FIG. 4 shows a rear view of rack 10, with only one of the pair of support assemblies 18 depicted. For the purposes of the description below, it may be assumed that the second support assembly is similarly configured.

Loading arm 40 may extend roughly parallel to the ground, or a surface on which vehicle 16 is resting. The loading arms may also extend slightly upward, to encourage return of cargo such as kayak 12 toward rail 24. The angle of loading arm 40 relative to the ground may be determined by angle 58 between the loading arm and rail 24, and an angle 62 between rail 24 and base 26.

Parallel side portions 54 of loading arm 40 include an angled portion 64, having a generally concave or v-shape in the depicted example. Angled portion 64 may serve to reduce a risk of kayak 12 slipping from the loading position, prior to application of straps 22. That is, a lower edge of the hull of kayak 12 sliding along the length of loading arm 40 may contact angled portion 64 and be prevented from further movement. In some examples, loading arm 40 may include a projection, an angled portion of another shape, or any shape or features appropriate to support of cargo during loading.

Loading arm 40 may be disposed at approximately waist-height for a user of rack 10, at approximately half the height of vehicle 16, or at any height appropriate to loading of cargo. The height of loading arm 40 when rack 10 is in the loading configuration may be determined by a distance AA between the pivotable mounting of rail 24 to base 26 and the pivotable mounting of loading arm 40 to rail 24, and by angle 62.

Rail 24 is spaced a distance BB from the side of vehicle 16. That is, rack 10 does not contact vehicle 16, apart from the coupling of clamps 28 to crossbars 14. Spacing BB may depend on a shape of vehicle 16, as well as distance AA, angle 62, and a distance CC between clamp 28 and the pivotable mounting of rail 24 to base 26. Clamp 28 is positioned proximate an outboard end of crossbar 14. Base 26 extends outboard of crossbar 14, but in the present example does not extend outboard of the side of vehicle 16. Placement of clamp 28 proximate the end of crossbar 14 and extension of base 26 outboard of crossbar 14 may increase spacing BB, and/or provide spacing BB for a vehicle with a curved side contour. In an example where rack 10 contacts the side of vehicle 16, padding or cushioning of some type may be provided on a lower surface of rail 24 to prevent damage to the vehicle.

In some examples, rack 10 may include adjustable features, to allow customization of angles 58, 62, distances AA, BB, and CC, and/or height of loading arm 40. For instance, rail 24 may telescope to different lengths, clamp 28 may be adjustably positionable along base 26, or rail 24 may ratchet between multiple angles 62. In some examples, rack 10 may be included in a set of racks, each rack having dimensions appropriate to a class or model of vehicle.

Figure 5:
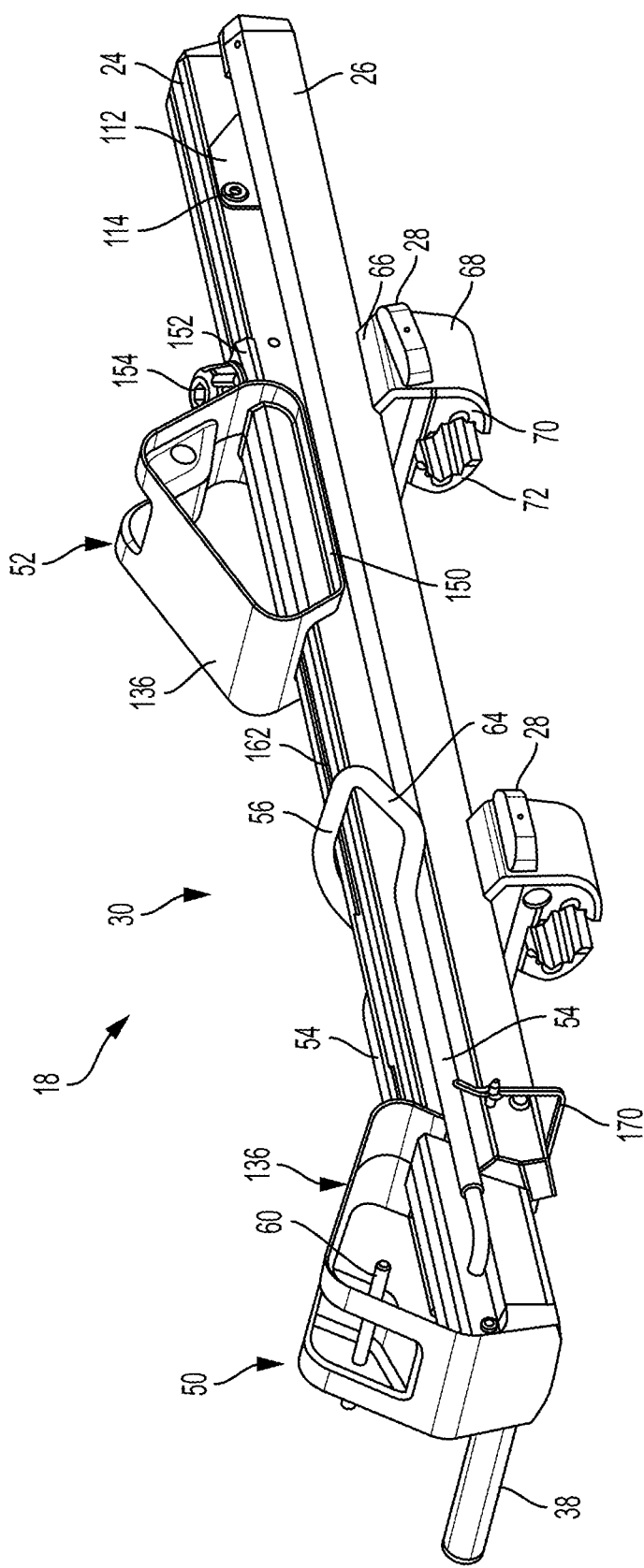
FIG. 5 is an isometric view of a support assembly of the rack of FIG. 1, with the extendable rail in a first position.

Rack 10 may also be placed in a third, stowed configuration. FIG. 5 shows one support assembly in this configuration, with rail 24 in first position 30 and loading arm 40 in collapsed position 46. Loading arm 40 may be retained in collapsed position by securing adjustable mount 52 with an outboard edge of the mount overhanging or in frictional contact with handle portion 56 of the loading arm. In stowed configuration, rack 10 may be left installed on the vehicle when not transporting cargo. Rack 10 may present a reduced aerodynamic profile in this configuration, improving sound and other possible effects related to a roof rack in transit.

To load kayak 12 or other cargo onto rack 10, a user may begin with rack 10 in stowed configuration. Referring sequentially to FIGS. 2-4, and then back to FIG. 1, the user may perform a number of steps further described below.

The user may grasp handles 38 and pull rails 24 out away from vehicle 16, from first position 30 to second position 32. The user may lower handles 38, pivoting rails 24 relative to bases 26. The user may release handles 38 and free loading arms 40 by moving adjustable mounts 52 up rails 24. Grasping handle portions 56 of loading arms 40, the user may pivot the loading arms from collapsed position 46 to loading position 48. The user may position adjustable mounts 52 at a distance from stationary mounts 50 appropriate to the dimensions of kayak 12.

With rack 10 in loading configuration, the user may place kayak 12 onto loading arms 40, leaning the hull of the boat against mounts 50, 52. For each support assembly 18, the user may thread the strap of a strap and buckle assembly 22 through an aperture in stationary mount 50, over kayak 12, through an aperture in adjustable mount 52, and use the buckle to tighten and secure the strap against kayak 12.

Once kayak 12 is secure, the user may use handles 38 to lift rails 24 from third position 34 to second position 32, and then slide rails 24 toward vehicle 16 to first position 30. The user may engage a locking device or latch to secure rail 24 relative to base 26. In some examples, an actuator for a locking device may be included in handle 38, a separate handle on support assembly 18 may actuate a locking device, and/or any effective mechanism may be included in the support assembly to releasably secure rail 24.

FIG. 5 is an isometric view of the right-hand support assembly 18 of rack 10. Extendable rail 24 is in first position 30, and loading arm 40 is in collapsed position 46. Each of the pair of clamps 28 includes an upper body 66 that is shaped to conform to a lower surface of base 26, and a lower body 68 with a first jaw 70 and a second jaw 72. Upper body 66 may be bolted to base 26 as in the present example, may be slidably coupled to the base, or may be attached to base 26 in any effective manner.

Figure 6:
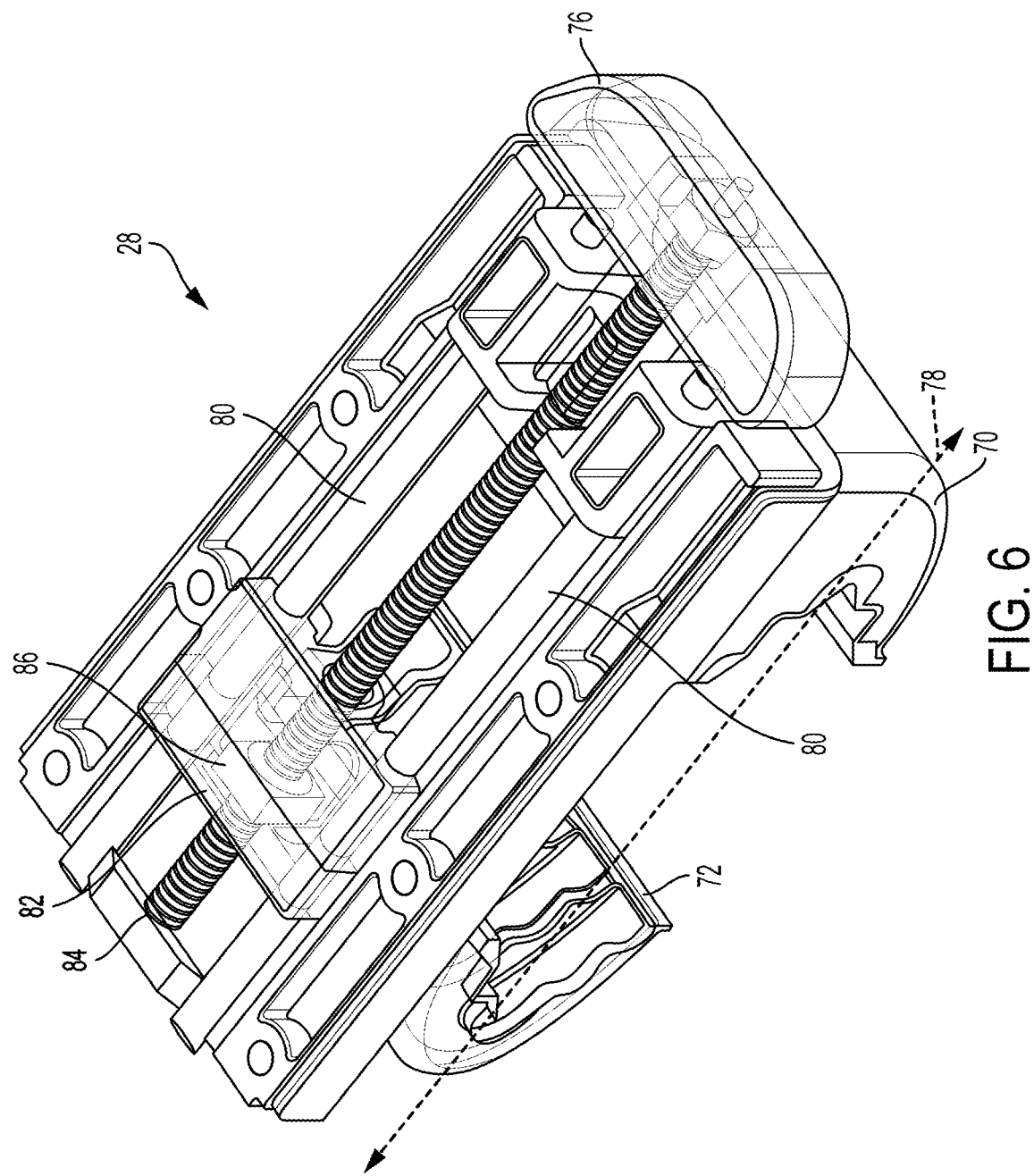
FIG. 6 is a partially transparent isometric view of a lower portion of a clamp of the support assembly of FIG. 5.

FIG. 6 shows lower body 68 of one of clamps 28, with second jaw 72 and a handle 76 shown as transparent. The two clamps may be matching, and therefore FIG. 6 may illustrate both clamps 28. An actuator 74 extends through the clamp, including handle 76 at an end of the clamp. Second jaw 72 moves toward or away from first jaw 70, along a horizontal axis 78 generally perpendicular to base 26. When rack 10 is mounted on vehicle 16, horizontal axis 78 may be parallel to direction of travel 20 of the vehicle.

Motion of jaw 72 is controlled by actuator 74. By turning handle 76 in a clockwise or counterclockwise direction, a user may pull second jaw 72 toward first jaw 70 or push it away. That is, actuator 74 is configured to adjust the spacing between first jaw 70 and second jaw 72. This motion serves to open or close clamp 28.

Lower body 68 includes 6 screw channels for screwing lower body 68 to upper body 66, and two guides 80. First jaw 70 is formed as part of lower body 68. Second jaw 72 includes a connector portion 82 with three apertures and a rectangular recess. Guides 80 and an actuator bolt 84 extend through the apertures of connector portion 82, mounting second jaw 72 on lower body 68. A square nut 86 is disposed in the recess of connector portion 82, threaded onto actuator bolt 84.

The head of actuator bolt 84 is received in handle 76, with a hex shape configured to resist rotation. Therefore, when handle 76 is rotated, actuator bolt 84 is also rotated. Rotation of the bolt exerts a force on square nut 86, which in turn urges connector portion 82 along guides 80. Second jaw 72 is thereby moved along axis 78 when handle 76 is rotated.

Second jaw 72 may be moved distant from first jaw 70 in order to insert a crossbar between the jaws, then jaw 72 may be moved close to jaw 70 to grip the crossbar. In some examples, one or both of clamps 28 may include a lock mechanism to prevent rotation of handle 76 without use of a key. Locking clamps 28 in a closed position on a crossbar may prevent unauthorized removal of support assembly 18 from the vehicle.

Figure 7:
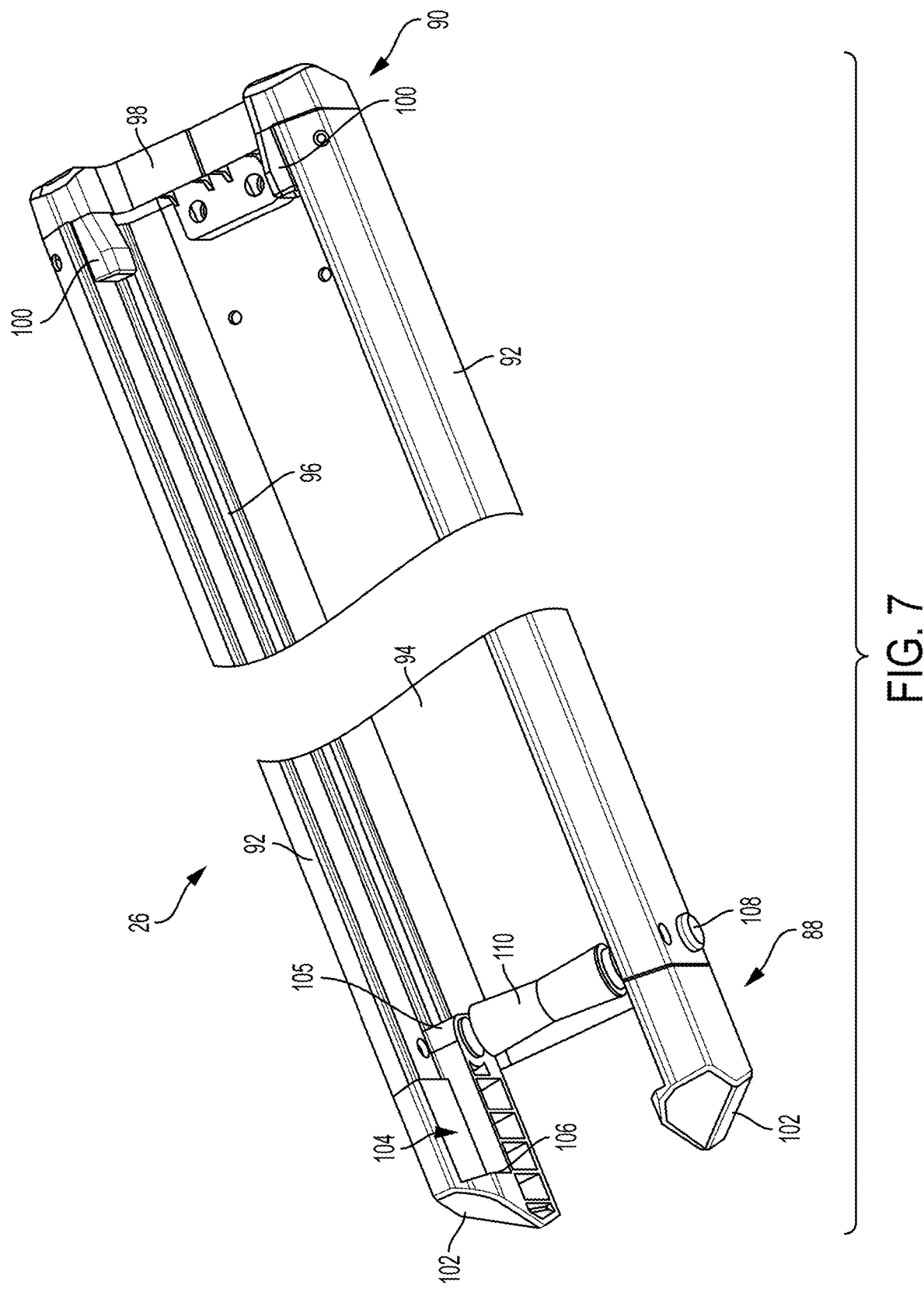
FIG. 7 is a partial isometric view of a base of the support assembly of FIG. 5.

FIG. 7 shows an outboard end 88 and an inboard end 90 of base 26. 'Outboard' and 'inboard' as used to describe base 26 and support assembly 18 refer in the present description to outboard and inboard directions on vehicle 16, as shown in FIG. 1. The base also has a central portion that is not shown in FIG. 7, but continues similarly.

Base 26 may be described as generally U-shaped in cross-section, and has two sidewalls 92 connected by a floor 94. Each sidewall 92 includes a recessed roller track 96, which can be seen in more detail in FIG. 12 and will be discussed further below. An upper channel 104 is defined between sidewalls 92, above roller tracks 96.

In some examples, sidewalls 92 and floor 94 of base 26 may be part of a single extrusion, or extruded structure. For instance, base 26 may be primarily an extruded length of aluminum. In some examples, base 26 may include multiple connected extrusions and/or other components. The base may have any shape appropriate to sliding and pivoting engagement with the extendable rail.

At inboard end 90, base 26 includes an end cap 98 that defines an end or termination of roller track 96 and spans between sidewalls 92. The end cap also includes a protrusion or curb 100 adjacent each sidewall, defining an end of upper channel 104. At outboard end 88, base 26 includes an end cap 102 on each sidewall 92. Each end cap 102 defines an end or termination of roller track 96 in the respective sidewall. Each end cap is also shaped to continue upper channel 104, and includes a protrusion 106 that defines an end of the channel.

A rounded portion 105 of each end cap 102 extends inboard between sidewalls 92, the rounded portion have an aperture through which a bar 108 extends. The bar further extends through corresponding apertures in sidewalls 92. A roller 110 is rotatably mounted on bar 108, and held between rounded portions 105 of endcaps 102. The diameter of roller 110 varies along the length of the roller, having a least value proximate a center point of the roller.

Figure 8:
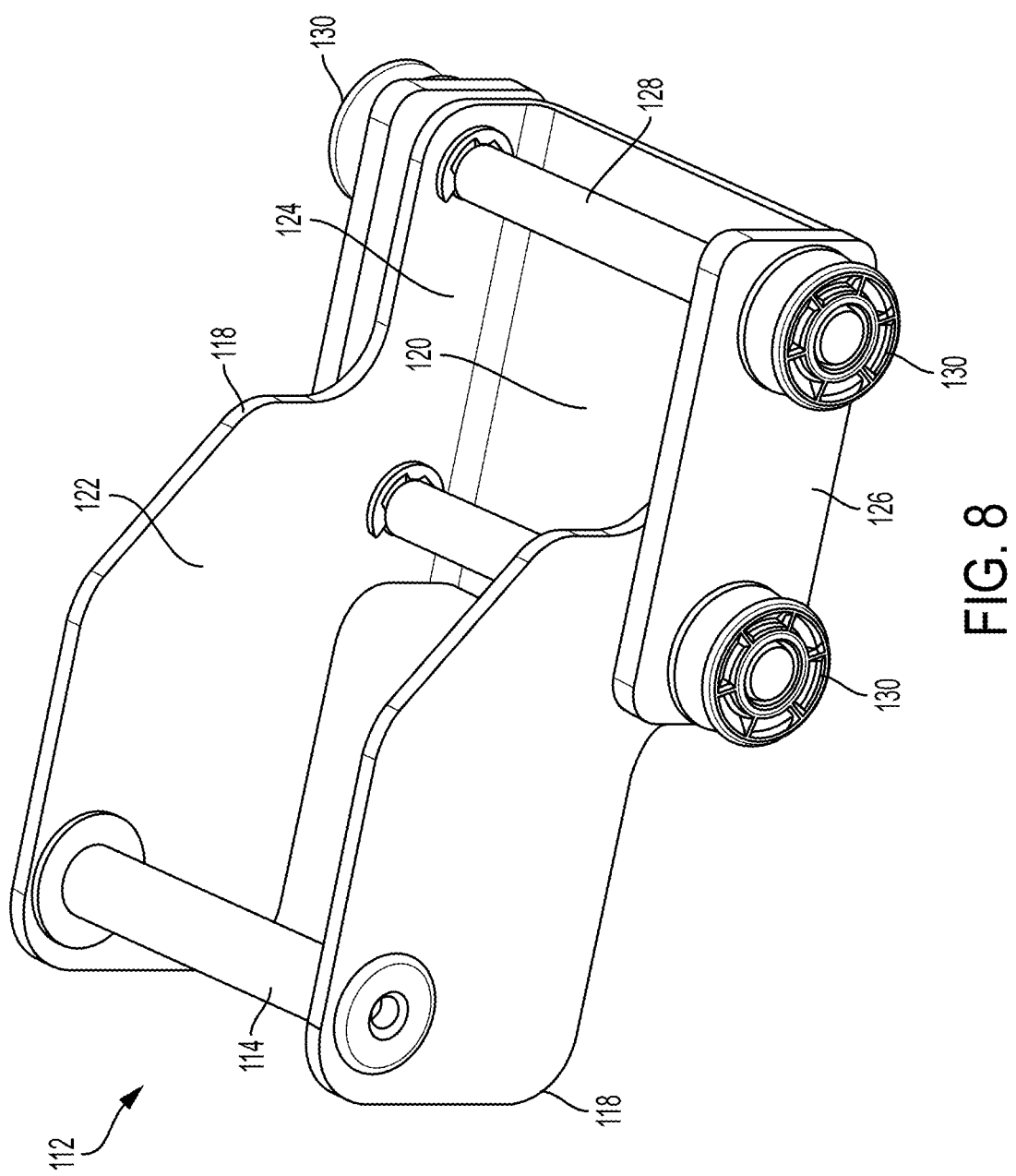
FIG. 8 is an isometric view of a roller carriage of the support assembly of FIG. 5.

Referring briefly back to FIG. 5, base 26 is dimensioned to partially receive rail 24 and a connected roller carriage 112. In the present example, the carriage is pivotably connected to proximal end portion 42 of rail 24, by a bar 114. The carriage may also be pivotably connect to rail 24 by any appropriate structure. Carriage 112 can be seen in more detail in FIG. 8. The carriage includes a bracket 116 having two side plates 118 and a central span 120.

Side plates 118 each include an upper extent 122 and a lower extent 124, where pivot bar 114 spans between the side plates proximate a forward end of each upper extent 122. Upper extent 122 and lower extent 124 are generally rectangular in shape. A scuff plate 126 of similar rectangular shape to lower extent 124 is mounted to an outside face of the lower extent on each side plate 118.

Axles 128 extend through corresponding apertures in scuff plates 126 and side plates 118. On a first and second end of each axle 128, a roller 130 is mounted. In the present example, each roller 130 includes an inner flange that is received in a circumferential recess of respective axle 128. Each axle further includes another circumferential recess proximate an inner face of each side plate 118. C-clips received in these recesses maintain axles 128 in roller carriage 112, and thereby mount rollers 130 to the carriage.

Central span 120 of carriage 112 defines a spacing between side plates 118 sufficient to receive rail 24, as shown in FIG. 5. Bar 114 extends through a lateral aperture in rail 24, such that the rail may pivot relative to carriage 112. In other words, bar 114 of bracket 116 defines a tilt pivot axis 132, shown in FIG. 10 and discussed further below.

In some examples rollers 130 may be mounted to protrusions on scuff plates 126, or the rollers may be rotatably mounted to carriage 112 by any effective structure. Carriage 112 may have any shape or components appropriate to translatably engage base 26 and pivotably mount rail 24.

Figure 9:
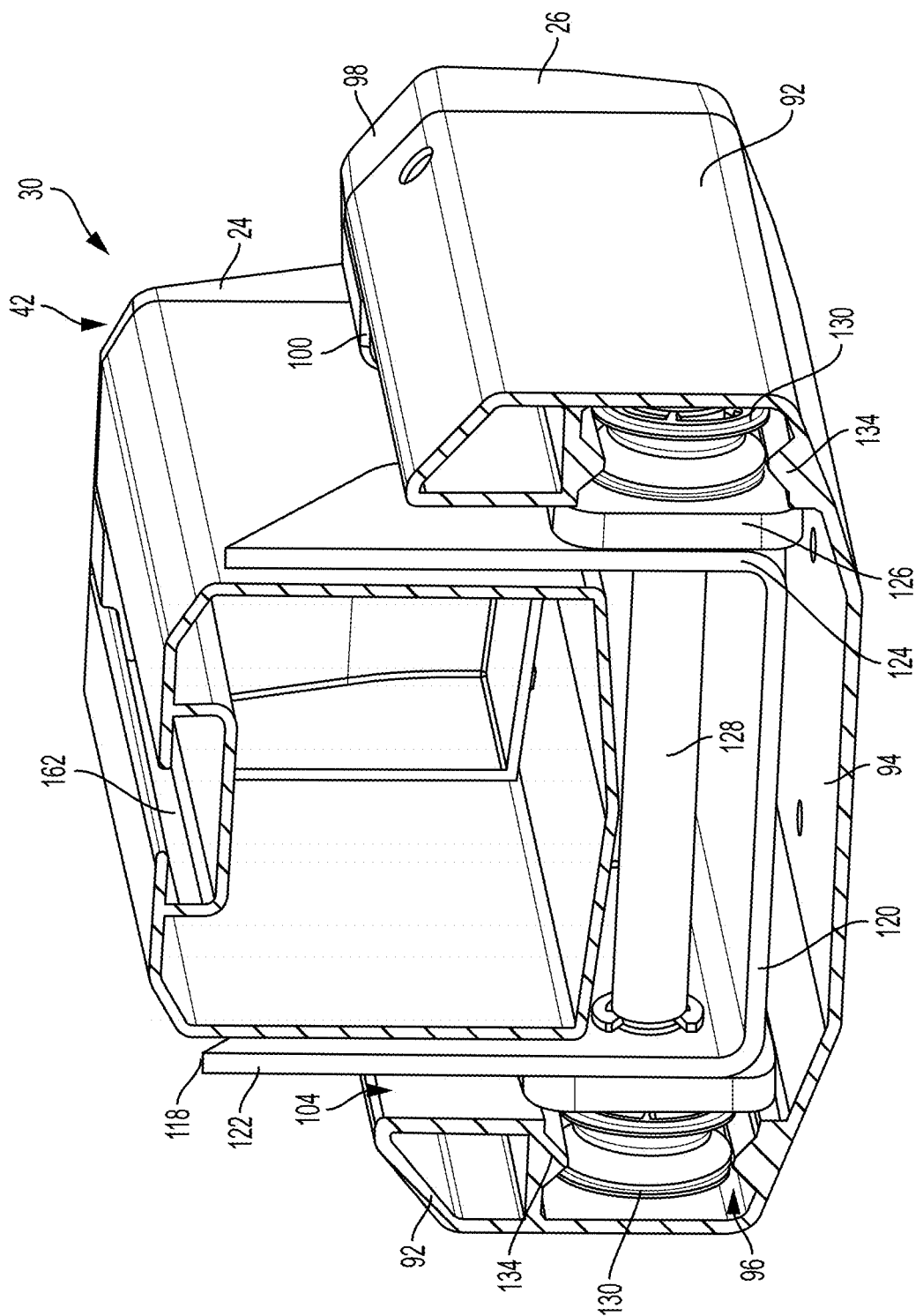
FIG. 9 is a cutaway isometric view of a proximal end portion of the extendable rail of the support assembly of FIG. 5, in the first position.

FIG. 9 is a cutaway view of carriage 112, base 26, and proximal end portion 42 of rail 24, with rail 24 in first position 30. Rail 24 is partially received between side plates 118 of carriage 112. Carriage 112 is in turn partially received between sidewalls 92 of base 26. Each roller 130 of carriage 112 is entirely received in recessed roller track 96 of the corresponding sidewall 92. Scuff plate 126 and side plate 118 however, are not received in the roller track. Upper extent 122 of each side plate 118 is received in upper channel 104 of the respective sidewall.

Roller tracks 96 of sidewalls 92 of base 26 each include a guide structure 134 comprising an upper and a lower protrusion extending along the length of the track. Rollers 130 have a complementary shape. That is, rollers 130 vary in diameter across their width, having a least diameter proximate a center point. Rollers 130 may therefore be retained in roller tracks 96 by guide structures 134. Guide structures 134 may also center rollers 130 in roller tracks 96 and thereby center carriage 112 in base 26.

It may be noted that rail 24 does not contact axles 128 of carriage 112, and is vertically spaced from the axles. Contact between the components may restrict rotation of rollers 130 and inhibit sliding of rail 24 relative to base 26. Similarly, guide structures 134 may serve to prevent or limit contact between scuff plates 126 and sidewalls 92. Floor 94 of base 26 may have a partially curved or angled cross-section such that the floor is spaced from central span 120 of carriage 112. This spacing may allow room for bolts or other fasteners to attach clamps to floor 94.

Carriage 112 may support proximal end portion 42 of rail 24, and may couple the rail to base 26. Rail 24 may be restrained from vertical and lateral movement relative to base 26 by engagement between rollers 130 and roller tracks 96. Carriage 112 may engage base 26 to prevent rail 24 from sliding further inboard relative to base 26. Upper extent 122 of side plates 118 may contact curbs 100 of end cap 98.

Figure 10:
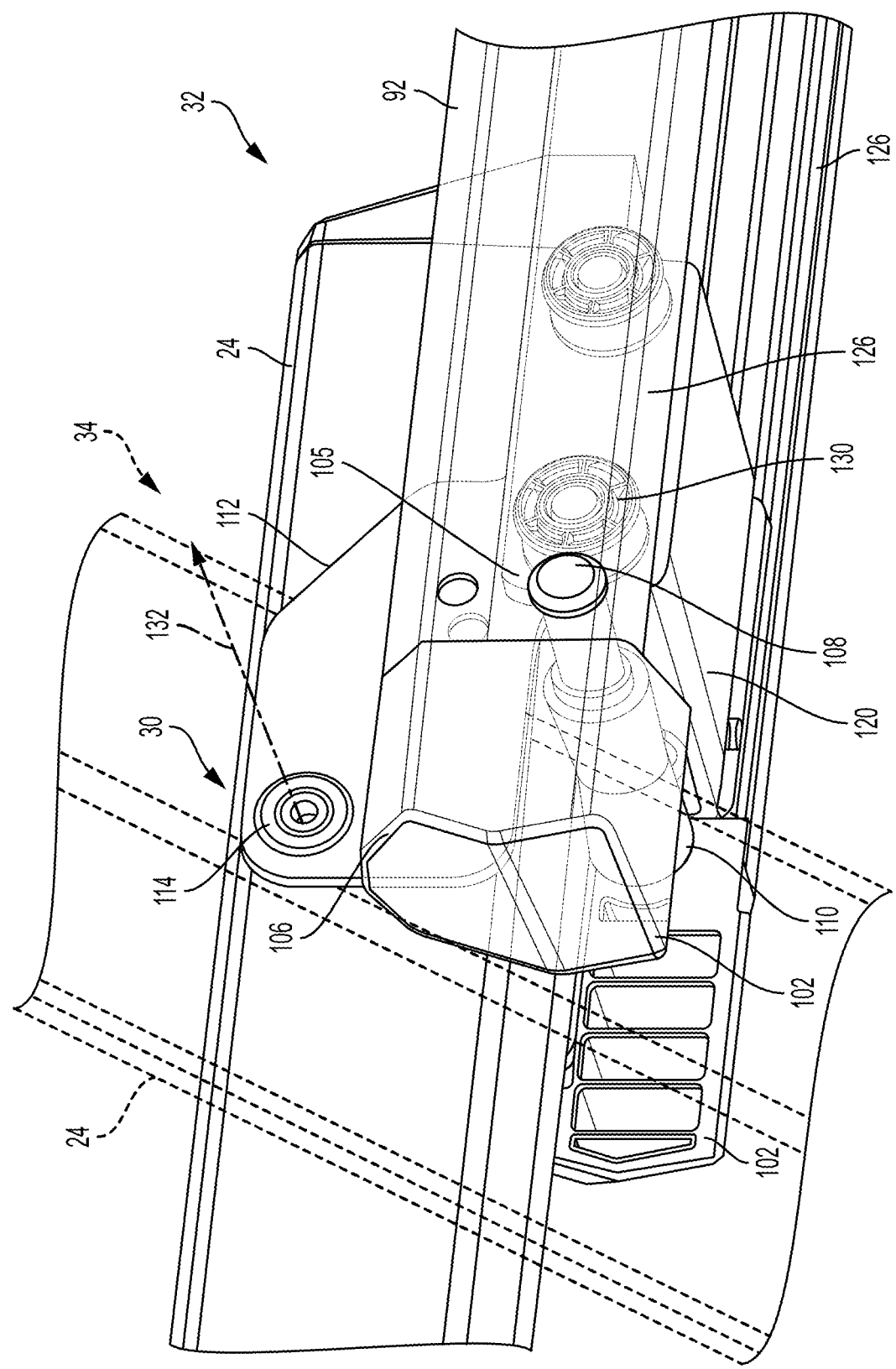
FIG. 10 is partially transparent isometric view of the proximal end portion of the extendable rail of the support assembly of FIG. 5, in the second and third position positions.

FIG. 10 is a partially transparent view of support assembly 18, with rail 24 in second position 32. Rail 24 is also shown in third position 34 by dashed lines. Carriage 112 is partially received in base 26, at outboard end 88 of the base. Further movement of carriage 112 in an outboard direction may be prevent by contact between scuff plates 126 and/or side plates 118, and end caps 102. Upper extent 122 of side plates 118 may contact protrusions 106 of end caps 102. Lower extent 124 of side plates 118 may contact rounded portions 105 of end caps 102. Rollers 130 are retained in roller tracks 96 of sidewalls 92, inboard of roller 110. However, pivot bar 114 is outboard of roller 110.

Pivot bar 114 defines pivot axis 132, around which rail 24 pivots relative to carriage 112 and base 26. In the present example, rail 24 pivots freely around bar 114. In some examples, the pivot mount may be spring biased, may include a latch or ratchet mechanism, and/or may have any appropriate modifications or restrictions to the pivot motion.

Carriage 112 engages base 26 to remain fixed relative to the base as rail 24 pivots about the axis. Specifically, rollers 130 engage roller tracks 96. Bar 114 and pivot axis 132 may therefore also remain fixed relative to base 26 as the rail pivots. However, carriage 112 translates along base 26 as rail 24 slides along the base, and therefore pivot axis 132 also translates along the base. The location of pivot axis 132 relative to roller 110 may determine whether rail 24 is able to be pivoted about the axis. When pivot axis 132 is inboard of roller 110, contact between rail 24 and the roller may prevent pivoting. When pivot axis 132 is outboard of roller 110, rail 24 may be free to pivot through an angular range.

Figure 14:
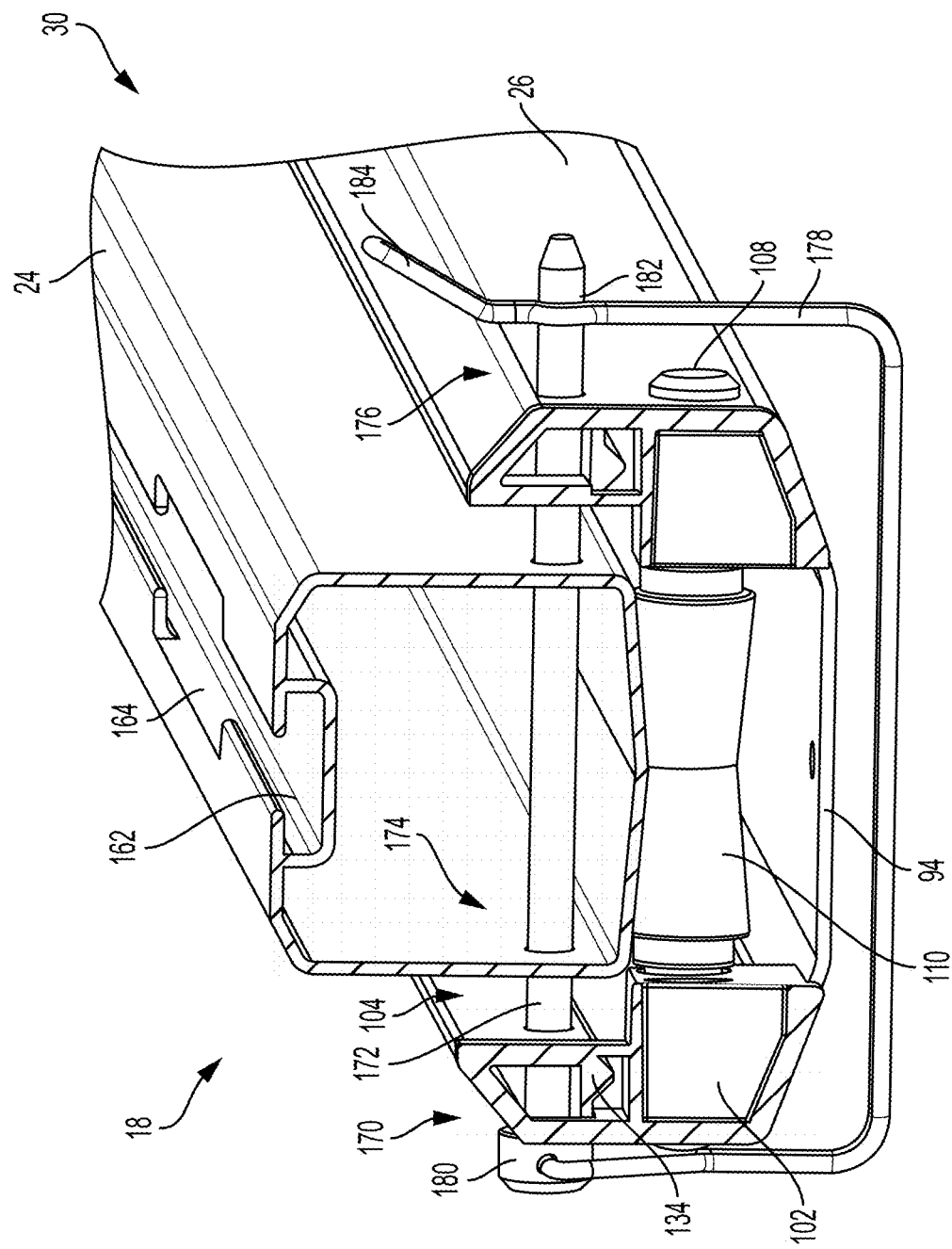
FIG. 14 is a cutaway isometric view of a locking device of the support assembly of FIG. 5.

As rail 24 slides between first position 30, as shown in FIG. 9, and second position 32, as shown in FIG. 10, rail 24 may be supported by roller 110. The rail may be held parallel to base 26 and prevented from pivoting relative to the base until reaching second position 32, or until pivot axis 132 is outboard of roller 110. As can be seen in FIG. 10, and is also shown in FIG. 14, rail 24 has an angled lower surface, with a shape complementing that of roller 110. The angled surface of rail 24 may center the rail on the roller, and facilitate smooth movement of the rail.

In second position 32, rail 24 may contact roller 110 at a first point along rail 24 inboard of pivot axis 132. In third position 34, rail 24 may contact roller 110 at a second point along rail 24 disposed outboard of pivot axis 132. As rail 24 pivots between second and third positions, the rail may not be in contact with roller 110. Contact between the second point on rail 24 and roller 110 in third position 34 may limit the angular pivot range of the rail, and transfer weight applied to rail 24 to base 26.

Figure 11:
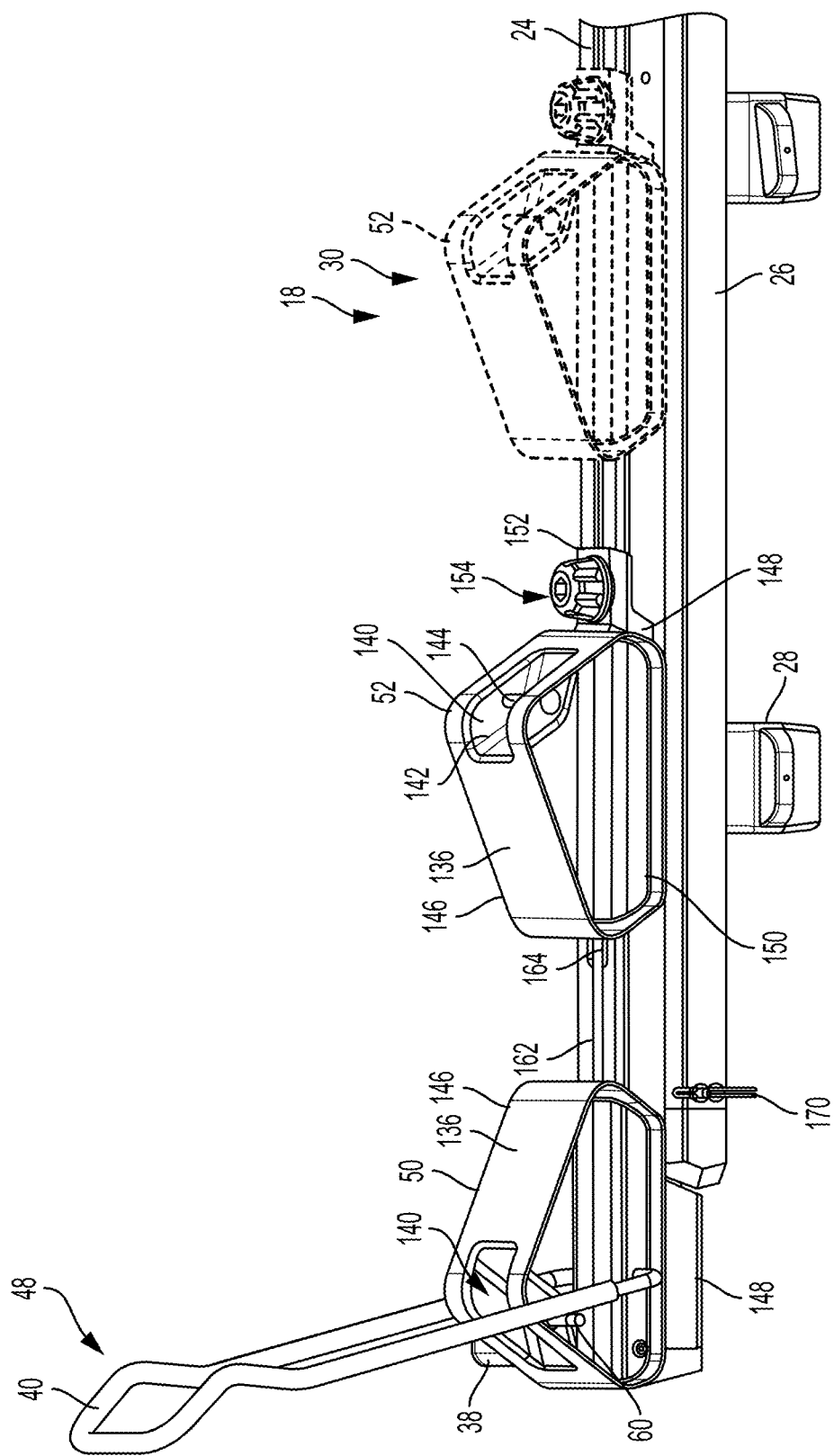
FIG. 11 is a partial isometric view of the support assembly of FIG. 5, illustrating motion of an adjustable saddle mount.

Support assembly 18 may also be adjustable, to accommodate a range of boat hulls or cargo dimensions. As shown in FIG. 11, adjustable saddle mount 52 may be positioned at different distances from stationary saddle mount 50, along rail 24. The distance between adjustable mount 52 and stationary mount 50 may be adjusted to correspond to the beam of a boat or other lateral measurement of cargo. FIG. 11 is a partial isometric view of support assembly 18, illustrating motion of adjustable saddle mount 52.

Stationary saddle mount 50 and adjustable mount 52 each include a support surface 136, configured to support a boat hull. In the present example, support surface 136 is an angled planar surface. Stationary mount 50 and adjustable mount 52 are mirrored, such that support surfaces 136 are angled to face one another. Fabric or foam pads may be permanently or removably attached to support surfaces 136, to prevent scuffing or other damage to loaded boats.

Saddle mounts 50, 52 may have support surfaces 136 of any appropriate shape, and in some examples may have differently shaped support surfaces. The saddle mounts may be configured to support a variety of boat hulls, or may be contoured to complement a specific hull shape. Supports appropriate to cargo other than boats may also be included in mounts 50, 52. In some examples, the mounts may include rollers, clamps, gel pads, or any mechanism suitable to support or secure cargo.

Each saddle mount also includes an aperture 140, defined by a bar extending through a recess 142. Adjustable mount 52 includes a strap bar 144, while the bar of stationary mount 50 is support member 60. Aperture 140 may be configured to receive a strap, cord, tie, and/or any flexible member appropriate to secure cargo to support assembly 18. The aperture may also be referred to as a tie-down point. A strap may be secured to bar 144 and/or support member 60, may loop around the bar and/or member, or may engage the bar and/or member in any effective manner.

In some examples, a strap may be included as part of rail 24. For instance, a first end of the strap may be anchored to a retraction mechanism disposed interior to rail 24. Apertures 140 and/or mounts 50, 52 may be configured to facilitate routing and extension of such a strap. In some examples, a fastener or buckle may be included in rail 24. For instance, handle 38 may include a locking cam buckle with a release actuator button. In such examples, the fastener or buckle of rail 24 may include a lock mechanism to prevent release of the strap without use of a key. Locking of the strap in a tightened configuration may prevent unauthorized removal of loaded cargo.

To secure cargo to support assembly 18 of the present example, a user may insert a first end of a strap through aperture 140 of stationary mount 50, in through a lower end of the aperture and out through an upper end. The user may extend the strap over cargo positioned on mounts 50, 52. Inserting the first end of the strap through aperture 140 of adjustable mount 52, the user may pass the strap in through an upper end of the aperture and out through a lower end. The user may insert the first end of the strap into a buckle disposed proximate a second end of the strap, and use the buckle to tighten the looped strap against the loaded cargo.

Figure 13:
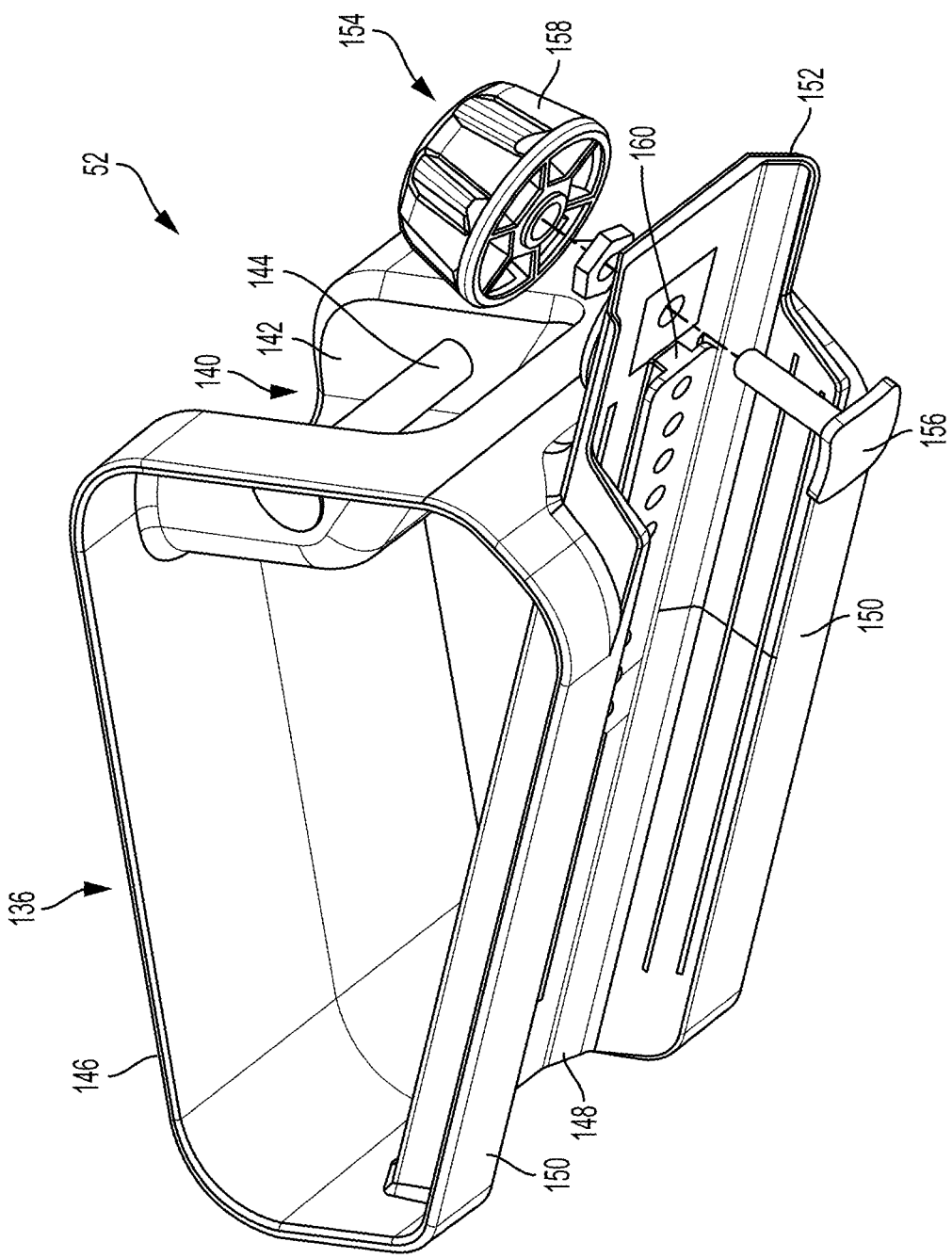
FIG. 13 is an exploded isometric view from below the adjustable saddle mount of the support assembly of FIG. 5.

FIG. 13 is an exploded view of adjustable mount 52. The mount includes a hollow main body 146, having a roughly triangular cross-sectional shape. The main body includes support surface 136 and recess 142, and is supported on a base 148. Base 148 includes two wings 150 and a tail portion 152.

A clamping mechanism 154 is mounted on tail portion 152. In the present example, the clamping mechanism includes a bolt 156 and knob 158. The bolt extends through an aperture in tail portion 152 to threadedly engage knob 158. Knob 158 is configured for manual manipulation, and turning the knob may raise or lower a head of bolt 156.

A T-shaped guide structure 160 is disposed on a lower surface of base 148. The guide structure is approximately aligned with bolt 156 of clamping mechanism 154. The guide structure and bolt 156 may both be appropriately located and of appropriate shape and dimension to be received by a T-shaped slot 162 extending along rail 24, shown in FIG. 11. The T-shaped cross section of slot 162 may be seen more clearly in FIG. 9.

As shown in FIG. 11, adjustable mount 52 is slidable along slot 162. Base 148 may extend parallel to rail 24, with wings 150 straddling the rail. That is, a wing 150 of base 148 may be disposed on either side of rail 24. The wings and slot 162 may center and guide adjustable mount 52 on rail 24. To position adjustable mount 52, a user may use knob 158 to draw up the bolt and slide the mount along slot 162 to a desired position. The user may then use the knob 158 to lower the bolt to engage clamping mechanism 154 by frictionally engaging an interior of slot 162, thereby securing the mount relative to rail 24.

Adjustable mount 52 may be movable outboard and inboard along the extent of rail 24, but may be prevented from lateral motion by contact of wings 150 with the rail and engagement of the T-shaped guide structure of the mount with slot 162. The mount may also be prevented from moving vertically by engagement of the T-shaped guide structure with slot 162.

However, adjustable mount 52 may be removable from rail 24. Slot 162 of the rail includes a widened opening 164. Opening 164 may also be seen in FIGS. 12 and 14. The opening may be sufficiently wide to permit passage of T-shaped guide structure 160 of adjustable mount 52 (see FIG. 13). Therefore, when adjustable mount 52 is positioned on rail 24 such that the T-shaped guide structure is aligned with opening 164, the mount may be lifted vertically, and removed from rail 24.

Figure 12:
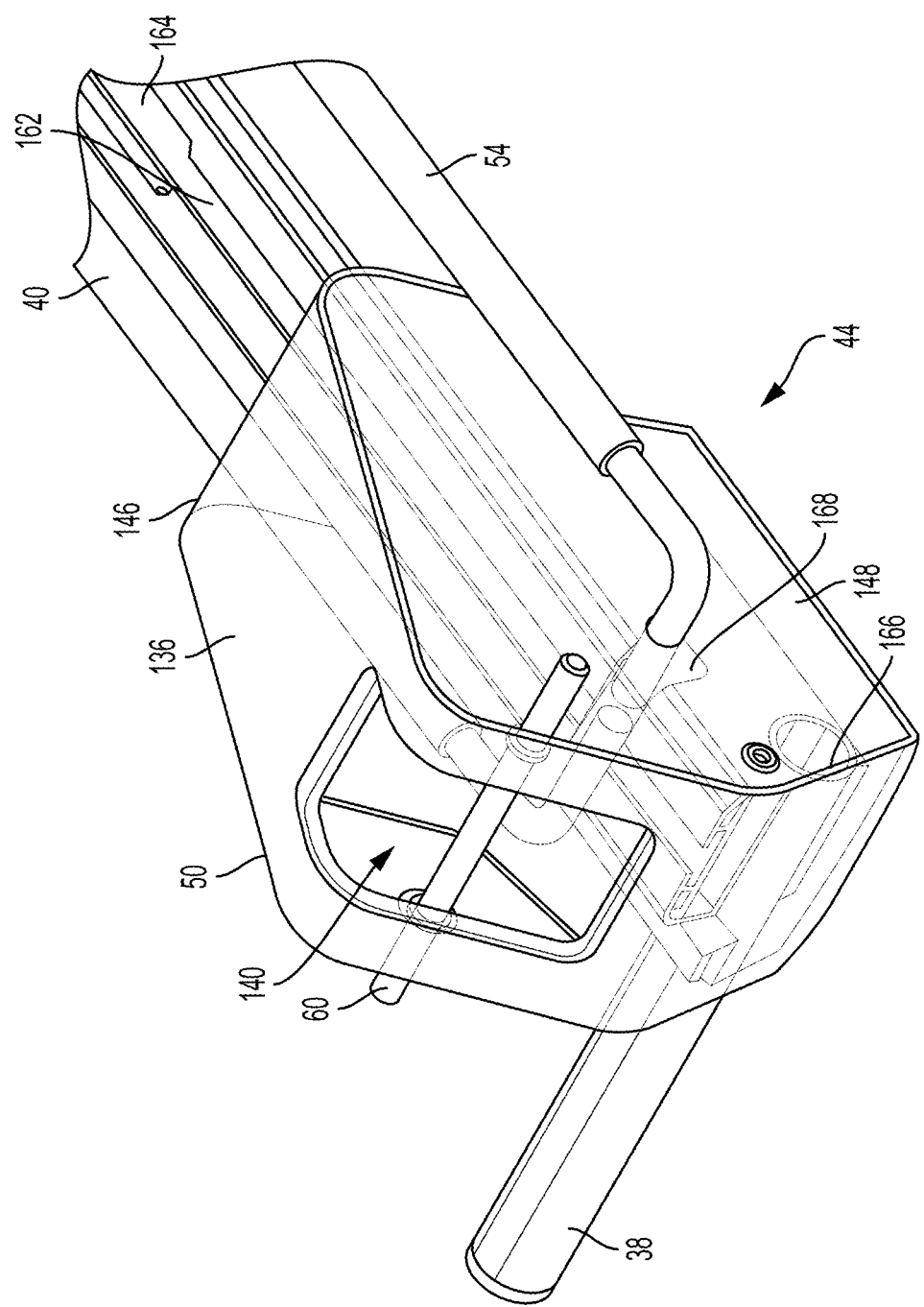
FIG. 12 is a partially transparent isometric view of a distal end portion of the extendable rail of the support assembly of FIG. 5.

FIG. 12 shows a partially transparent view of distal end portion 44 of rail 24, including stationary mount 50. The stationary mount has a structure generally matching that of adjustable mount 52, including a main body 146 and base 148. However, base 148 of stationary mount 50 extends around an end of rail 24 and is fixed to the rail. The mount may be formed as part of the rail, bolted to the rail as in the present example, or fixed to the rail in any appropriate manner.

Stationary mount 50 also includes apertures to receive handle 38 and loading arm 40, the apertures corresponding to openings in rail 24. As shown in FIG. 12, distal end portion 44 of rail 24 includes a distal opening 166 and an upper opening 168. Distal opening 166 has a non-circular shape, conforming to a non-circular cross-sectional shape of handle 38. The handle, received in distal opening 166, may thereby engage the opening to resist rotation by a user. Upper opening 168 by contrast, is configured to allow rotation of loading arm 40. The opening and corresponding aperture in stationary mount 50 are circular, to allow loading arm 40 to pivot freely.

In the present example, loading arm 40 is a partial, un-connected hoop or loop. In some examples, loading arm 40 may be complete connected hoop. The arm includes a structural core that extends into opening 168, and a sheathing covering a majority of the arm. The structural core may be comprised of a high-strength material suitable to support cargo weight, while the sheathing may comprise a compressible or high-friction material suitable to cushion and grip cargo. Arm 40 may also include any appropriate material or combination of materials.

In some examples, stationary mount 50 may be spaced from handle 38 and the pivot mounting of loading arm 40, along rail 24. In some examples, stationary mount 50 may be adjustable similarly to adjustable mount 52. In some examples mounts 50, 52 may both be removable and may be included in a set of pairs of mounts for support assembly 18, each pair of mounts being configured to support a different type of cargo.

In some examples, rail 24 may be a single extrusion, or extruded structure. For instance, rail 24 may be primarily an extruded length of aluminum. In some examples, rail 24 may include multiple connected extrusions and/or other components. The rail may have any shape appropriate to sliding and pivoting engagement with the stationary base.

Referring again to FIG. 5, support assembly 18 further includes a locking mechanism 170, which may also be referred to as a slide lock. When engaged, the slide lock prevents rail 24 sliding relative to base 26. Support assembly 18 may be retained in first position 30 by slide lock 170. Slide locks 170 of the pair of support assemblies 18 of rack 10 may be used to secure the rack either in stowed configuration or transport configuration, as shown in FIG. 1.

In the present example, slide lock 170 comprises a locking pin 172, shown in FIG. 14. An aperture 174 is defined in rail 24 by two corresponding holes. Similarly, an aperture 176 is defined in base 26 by four corresponding holes. Apertures 174 and 176 are disposed such that the two apertures align when rail 24 is in first position 30. Locking pin 172 extends through apertures 174 and 176 to lock rail 24 in the first position.

Slide lock 170 further includes a clip 178, to hold locking pin 172 in position. The clip is coupled to a head 180 of locking pin 172, at a first end of the pin. A second end of the pin extends through an aperture 182 of clip 178. The clip is at least partially comprised of a flexible material, and includes a tab 184. The tab is configured to release locking pin 172 from aperture 182 of the clip, allowing the pin to be withdrawn from support assembly 18. A user may manipulate tab 184 to release pin 172 and withdraw the pin prior to transitioning the rack to loading configuration.

During loading or unloading, locking pin 172 of each support assembly 18 may be allowed to hang from a lanyard or strap attached to base 26. Alternatively, pin 172 may be inserted through aperture 174 of rail 24, once the aperture is clear of base 26. The user may also set locking pin 172 aside.

Once cargo has been loaded or unloaded, and the rack returned to stowed or transport configuration, the user may reinsert locking pin 172 through apertures 174 and 176, securing the pin with clip 178.

Support assembly 18 may include any effective slide lock mechanism. The support assembly may also include lock mechanisms to secure pivoting of rail 24, pivoting of the loading arm, or any other motion of components of the assembly. Actuators for such locking mechanisms may be integrated into handle 38, or into any part of support assembly 18 accessible to a user.

Figure 15:
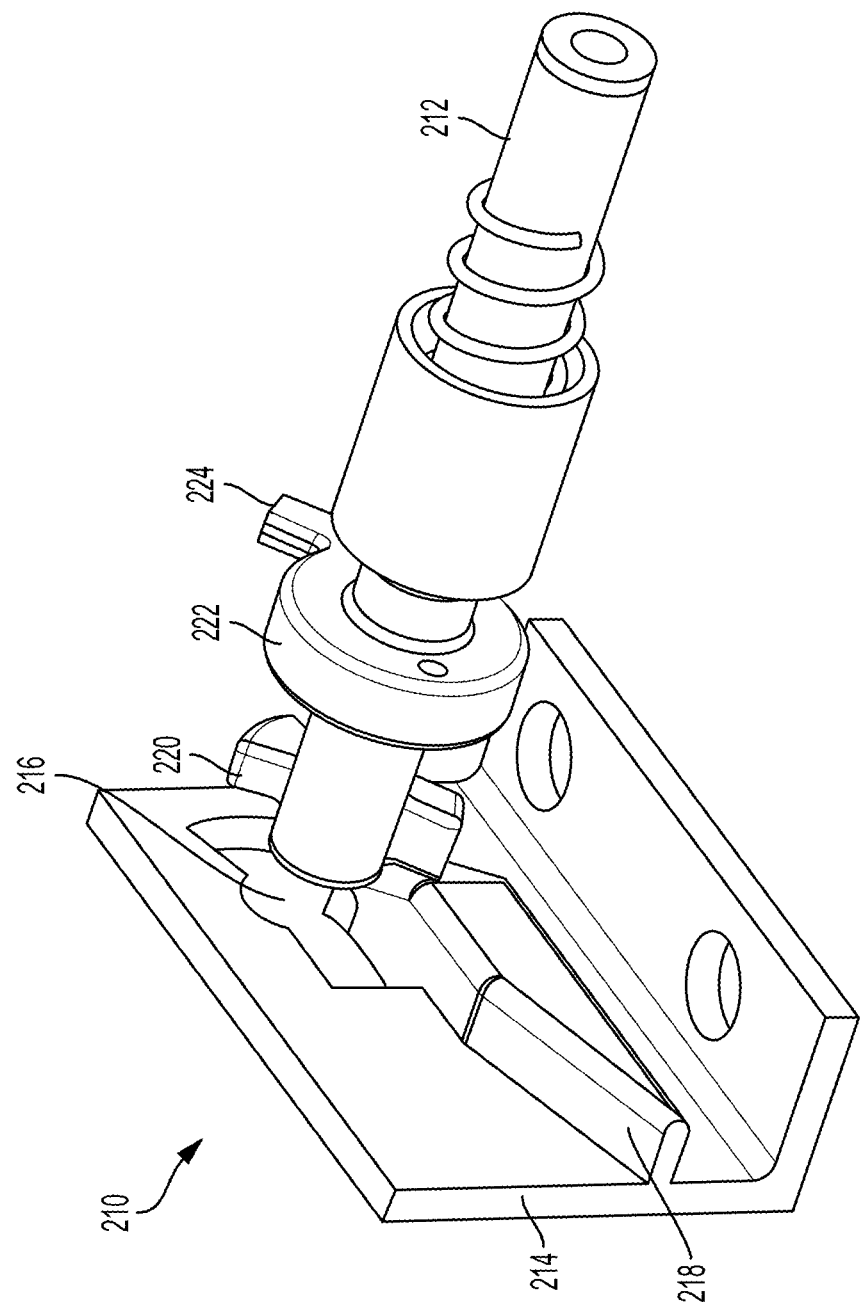
FIG. 15 is an isometric view of another locking device.

FIG. 15 shows an alternative example of a slide lock, generally indicated at 210. Slide lock 210 also includes a locking pin 212, which is configured to interface with a lock plate 214. The lock plate may be attached to the extendable rail, or may be formed as part of the rail. Lock pin 212 may connect to a handle, not shown, through an aperture in the stationary base.

Lock plate 214 includes an irregularly shaped gate 216 and a ramp 218. Locking pin 212 includes protrusions 220 corresponding to gate 216. When rotated to a correct orientation, pin 212 may pass through gate 216. A collar 222 on pin 212 prevents the pin being received through gate 216 beyond the collar. Pin 212 is spring-biased to extend through gate 216, when not blocked.

Slide lock 210 may transition between a locked position, with locking pin 212 extending through gate 216 into the extendable rail and an unlocked position, with the pin retracted. To transition the slide lock from locked position to unlocked position, a user may rotate pin 212 to match up with gate 216 and withdraw the pin through the gate. The user may again rotate the pin, to an orientation that will not allow the pin to pass through the gate. Slide lock 210 may therefore remain in the unlocked position, despite the spring-bias of pin 212.

The user may transition the extendable rail from the first position to the second and third positions for loading, then return the rail to first position for transport. As the rail returns to first position, ramp 218 of lock plate 214 may engage a projection 224 of collar 222 on pin 212. The ramp may rotate or reset the pin to an orientation matching gate 216. Locking pin 212 may then be urged by spring-bias through gate 216 to return slide lock 210 to the locked position. Slide lock 210 may therefore automatically lock when the extendable rail is returned to the first position.

Automatic locking of the extendable rail may be advantageous to avoid user error. This may prevent a user from neglecting to lock the rail in transport position, which could allow potential shifting of cargo during transportation.

Figure 16:
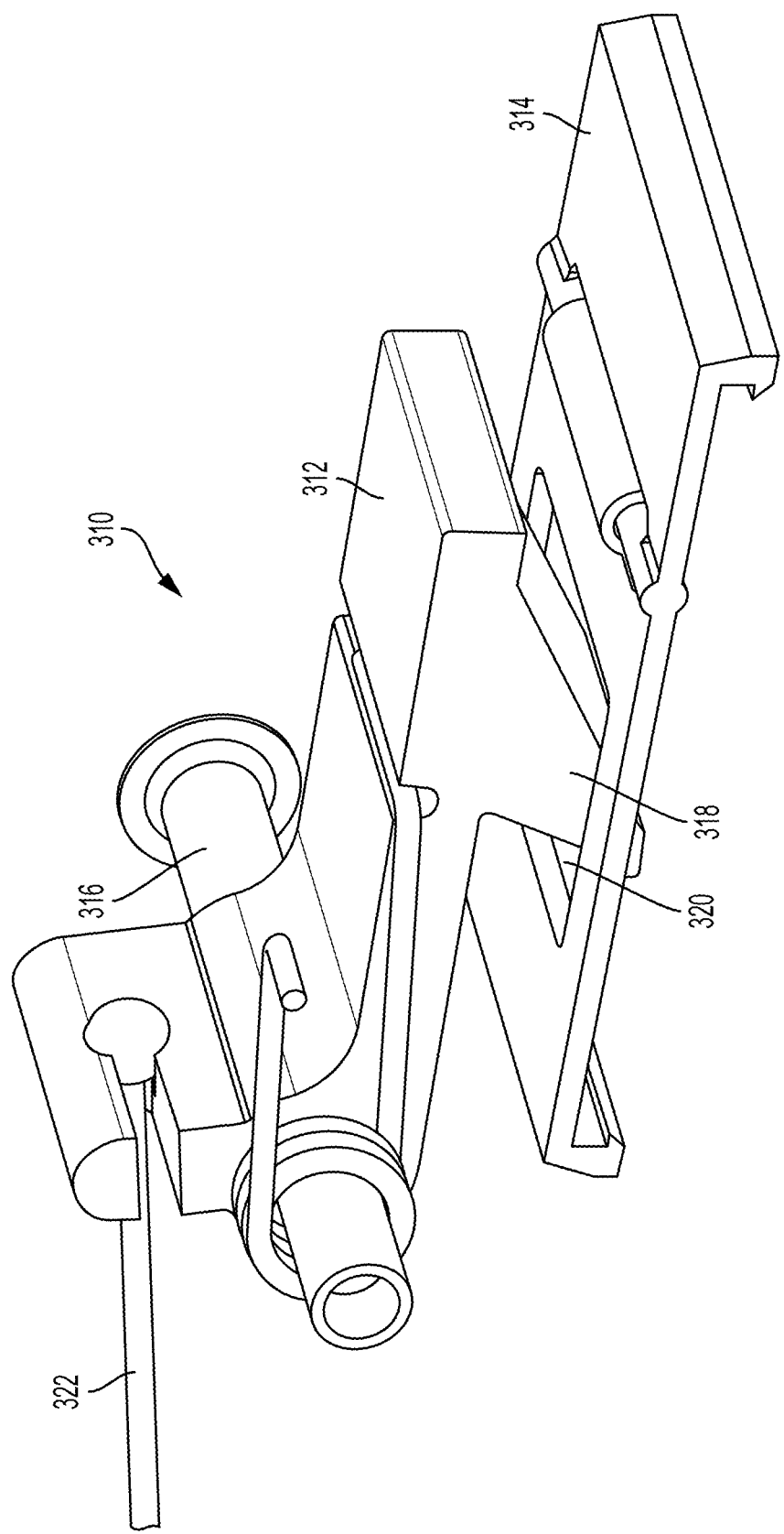
FIG. 16 is an isometric view of another locking device.

FIG. 16 shows another alternative example of a slide lock, generally indicated at 310. Slide lock 310 includes a pivotable latch 312 and a lock plate 314. The lock plate may be attached to the stationary base, or may be formed as part of the base. Latch 312 is pivotably mounted on the distal end portion of the extendable rail by bar 316. A spring biases the latch to pivot in a first direction.

Latch 312 includes a sloped protrusion 318 that is configured to extend into an aperture 320 of lock plate 314. When the extendable rail moves inboard along the stationary base, sloped protrusion 318 slides along the base until reaching aperture 320 and being urged by the spring-bias into receipt by the aperture. Once protrusion 318 is received in aperture 320, the extendable rail may be prevented from sliding outboard relative to the stationary base.

A first end of a cable 322 is retained in latch 312. A second end of the cable may be anchored to a handle or other actuator. Pulling on cable 322 may pivot latch 312 about bar 316, releasing protrusion 318 from the aperture and allowing the extendable rail to be drawn outboard relative to the base.

Slide lock 310 may therefore automatically latch as the extendable rail is transitioned into the first position. As previously described, such automatic latching may be advantageous.

Additional Examples and Illustrative Combinations

This section describes additional aspects and features of a load assisted rack, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A rack for carrying cargo on top of a vehicle, comprising:
 a pair of longitudinal support assemblies, each support assembly being configured for mounting on a crossbar secured transversely across a roof of a vehicle, each support assembly having a stationary base and an extendable rail, each rail being moveable between a first position in which the rail is substantially coextensive with the base, a second position in which the rail extends significantly beyond an end of the base, and a third position in which the rail pivots downward adjacent a side of the vehicle, wherein each rail has a proximal end portion and a distal end portion, the proximal end portion being pivotally connected to the base, and
 a loading arm pivotally connected to the distal end portion of the rail, the loading arm being moveable between a collapsed position parallel to the rail, and a loading position extending laterally relative to a vehicle when the rail is in the third position.

A1. The rack of A0, wherein each loading arm forms an obtuse angle with the respective rail when the loading arm is in the loading position.

A2. The rack of A0, wherein each loading arm is in the form of a hoop.

A3. The rack of A2, wherein the hoop has first and second parallel side portions connected by a handle portion, wherein the side portions straddle the respective rail when the loading arm is in the collapsed position.

A4. The rack of A3, wherein the side portions contact a support member coupled perpendicular to the distal end portion of the respective rail when the loading arm is in the loading position.

A5. The rack of A0, wherein each loading arm has an angled portion configured to restrict motion of a boat hull in loading position.

B0. A rack for carrying cargo on top of a vehicle, comprising:
 a pair of longitudinal support assemblies, each support assembly being configured for mounting on a crossbar secured transversely across a roof of a vehicle, each support assembly having a stationary base and an extendable rail, each rail being moveable between a first position in which the rail is substantially coextensive with the base, a second position in which the rail extends significantly beyond an end of the base, and a third position in which the rail pivots downward adjacent a side of the vehicle, wherein each rail has a proximal end portion and a distal end portion, the proximal end portion being pivotally connected to the base, and each rail including a stationary saddle mount connected to the distal end portion, and an adjustable saddle mount moveable lengthwise along the rail configured to adapt the rack for carrying cargo of different widths.

B1. The rack of B0, wherein each saddle mount has a support surface for contacting a boat hull, and a bar for engaging a strap.

B2. The rack of B0, wherein each rail includes a handle connected to the distal end portion of the rail.

B3. The rack of B2, wherein the handles extend inward toward each other in a region defined between the pair of longitudinal support assemblies.

B4. The rack of B0, wherein each support assembly includes a pair of clamps for securing the support assembly to a crossbar, each of the clamps having a stationary jaw and a translating jaw that moves toward the stationary jaw along a horizontal axis.

B5. The rack of B0, wherein each longitudinal support assembly has a strap, and each saddle mount has an aperture, the strap extending along the respective rail and passing through the aperture in each saddle mount.

C0. A rack for carrying cargo on top of a vehicle, comprising:

a pair of longitudinal support assemblies, each support assembly being configured for mounting on a crossbar secured transversely across a roof of a vehicle, each support assembly having a stationary base and an extendable rail, each rail being moveable between a first position in which the rail is substantially coextensive with the base, a second position in which the rail extends significantly beyond an end of the base, and a third position in which the rail pivots downward adjacent a side of the vehicle, wherein each rail has a proximal end portion and a distal end portion, the proximal end portion being pivotally connected to the base, wherein each base has an extruded slot for guiding movement of the extendable rail as it moves between the first and second positions.

C1. The rack of C0, wherein each rail has a roller attached to the proximal end portion configured to roll in the slot of the respective base.

C2. The rack of C1, wherein each slot includes a guide structure and each roller is shaped to conform to the guide structure.

C3. The rack of C1, wherein each rail has a bracket configured to connect rollers to the proximal end portion of the rail and to define a tilt pivot axis for transitioning the rail between second and third positions.

C4. The rack of C3, wherein each base includes a stationary roller mounted proximate the end of the base and configured to support the respective rail.

C5. The rack of C4, wherein extension of the rail relative to the respective base is limited by contact between the bracket of the rail and the base.

C6. The rack of C4, wherein each roller and respective rail are complementarily shaped.

C7. The rack of C4, wherein each rail defines an angle relative to the respective base when in the third position, and the angle is limited by contact between the rail and the roller of the base.

C8. The rack of C0, wherein each rail has a slot configured for mounting a saddle mount, and permitting the saddle mount to be adjustably positioned along a lengthwise span of the rail.

C9. The rack of C8, wherein the saddle mount includes a clamping device for securing the saddle mount relative to the rail.

C10. The rack of C0, wherein each support assembly has a locking device configured for selectively locking the respective rail in the first position.

C11. The rack of C10, wherein the locking device includes a pin dimensioned for receipt in a hole defined in the distal end portion of the rail.

C12. The rack of C10, wherein each rail includes a stationary saddle mount connected to the distal end portion, and an adjustable saddle mount moveable lengthwise along the rail configured to adapt the rack for carrying boat hulls of different sizes.

C13. The rack of C10, wherein each rail includes a loading arm pivotally connected to the distal end portion of the rail, the loading arm being moveable between a collapsed position parallel to the rail, and a loading position extending laterally relative to a vehicle when the rail is in the third position.

C14. The rack of C13, wherein each loading arm forms an obtuse angle with the respective rail when the loading arm is in the loading position.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A rack for carrying cargo on top of a vehicle, comprising:
  a pair of longitudinal support assemblies, each support assembly being configured for mounting on a crossbar secured transversely across a roof of a vehicle, each support assembly having a stationary base and an extendable rail, each rail being received in the respective base, and independently moveable between a first position in which the rail is substantially coextensive with the base, a second position in which the rail extends significantly beyond an end of the base, and a third position in which the rail pivots downward adjacent a side of the vehicle, wherein each rail has a proximal end portion and a distal end portion, the proximal end portion being pivotally connected through a moveable bracket to the base, and configured to pivot around a pivot bar extending laterally across the bracket, and
  a loading arm pivotally connected to the distal end portion of the rail, the loading arm being moveable between a collapsed position parallel to the rail, and a loading position extending laterally relative to a vehicle when the rail is in the third position,
  wherein the pair of longitudinal support assemblies are configured to support an item of cargo spanning between the pair of support assemblies, generally parallel to a direction of travel of the vehicle,
  wherein the base includes a pair of laterally spaced sidewalls connected by a floor, each of the sidewalls having an end cap extending beyond the floor and defining an open passageway at the end of the base, wherein the rail pivots through the passageway as it moves from the second position to the third position.

2. The rack of claim 1, wherein each loading arm forms an obtuse angle with the respective rail when the loading arm is in the loading position.

3. The rack of claim 1, wherein each loading arm is in the form of a hoop having first and second parallel side portions connected by a handle portion, wherein the side portions straddle the respective rail when the loading arm is in the collapsed position.

4. The rack of claim 1, wherein each loading arm has an angled portion configured to restrict motion of a boat hull in loading position.

5. The rack of claim 1, wherein each rail is spaced from the side of the vehicle in the third position.

6. The rack of claim 1, wherein each rail is configured to support a boat, and each base includes a pivot stop structure that limits an angular pivot range of the corresponding rail such that the rail is prevented from contacting the side of the vehicle while supporting the boat.

7. The rack of claim 1, further including an item of cargo, wherein the item is secured to each of the pair of support assemblies and spans between the support assemblies.

8. A rack for carrying cargo on top of a vehicle, comprising:
  a pair of longitudinal support assemblies, each support assembly being configured for mounting on a crossbar secured transversely across a roof of a vehicle, each support assembly having a stationary base and an extendable rail, each rail being received in the respective base, and independently moveable between a first position in which the rail is substantially coextensive with the base, a second position in which the rail extends significantly beyond an end of the base, and a third position in which the rail pivots downward adjacent a side of the vehicle, wherein each rail has a proximal end portion and a distal end portion, the proximal end portion being pivotally connected through a moveable bracket to the base, and configured to pivot around a pivot bar extending laterally across the bracket, and
  each rail including a stationary saddle mount fixed to the distal end portion, and an adjustable saddle mount moveable lengthwise along the rail configured to adapt the rack for carrying cargo of different widths,
  wherein each rail includes a handle connected to the distal end portion of the rail, the handles extending inward toward each other in a region defined between the pair of longitudinal support assemblies, and the handles being configured to allow a user to transition the rails between the first, second, and third positions,
  wherein each base includes a roller mounted on a bar extending laterally across the base, inboard from the end of the base, and each roller is in contact with the corresponding rail in the third position.

9. The rack of claim 8, wherein each saddle mount has a support surface for contacting a boat hull, and a bar for engaging a strap.

10. The rack of claim 8, wherein each support assembly includes a pair of clamps for securing the support assembly to a crossbar, each of the clamps having a stationary jaw and a translating jaw that moves toward the stationary jaw along a horizontal axis.

11. The rack of claim 8, wherein each longitudinal support assembly has a strap, and each saddle mount has an aperture, the strap extending along the respective rail and passing through the aperture in each saddle mount.

12. A rack for carrying cargo on top of a vehicle, comprising:
  a pair of longitudinal support assemblies, each support assembly being configured for mounting on a crossbar secured transversely across a roof of a vehicle,
  each support assembly having a stationary base and an extendable rail,
  each rail being received in the respective base, and independently moveable between a first position in which the rail is substantially coextensive with the base,
  a second position in which the rail extends significantly beyond an end of the base, and a third position in which the rail pivots downward adjacent a side of the vehicle,
  wherein each rail has a proximal end portion and a distal end portion, the proximal end portion being pivotally connected through a moveable bracket to the base, and configured to pivot around a pivot bar extending laterally across the bracket,
  wherein each base has an extruded slot for guiding movement of the extendable rail as it moves between the first and second positions, and
  wherein each base includes a first roller mounted on a bar extending laterally across the base, inboard from the end of the base, contact between the first roller and the corresponding rail limits an angular pivot range of the corresponding rail, and in the third position, the pivot bar is inboard from the end of the base.

13. The rack of claim 12, wherein each rail has at least a second roller attached to the proximal end portion and retained in the slot of the respective base.

14. The rack of claim 13, wherein the moveable bracket is configured to connect the second rollers to the proximal end portion of the rail and the pivot bar defines a tilt pivot axis for transitioning the rail between second and third positions.

15. The rack of claim 12, wherein each support assembly includes a saddle mount, and each rail has a slot configured for mounting the saddle mount, and permitting the saddle mount to be adjustably positioned along a lengthwise span of the rail.

16. The rack of claim 12, wherein each support assembly has a locking device configured for selectively locking the respective rail in the first position.

17. The rack of claim 16, wherein each rail includes a stationary saddle mount connected to the distal end portion, and an adjustable saddle mount moveable lengthwise along the rail configured to adapt the rack for carrying boat hulls of different sizes.

18. The rack of claim 16, wherein each rail includes a loading arm pivotally connected to the distal end portion of the rail, the loading arm being moveable between a collapsed position parallel to the rail, and a loading position extending laterally relative to a vehicle when the rail is in the third position.

19. The rack of claim 18, wherein each loading arm forms an obtuse angle with the respective rail when the loading arm is in the loading position.

20. The rack of claim 12, wherein a diameter of the first roller varies along a length of the first roller, the diameter having a least value proximate a center point of the first roller.

* * * * *